3,470,160
15,16 BETA-METHYLENE STEROIDS OF THE ESTRANE AND ANDROSTANE SERIES AND METHODS FOR PREPARING SAME
Otfried Schmidt, Klaus Prezewowsky, and Rudolf Wiechert, Berlin, Germany, assignors to Schering A.G., Berlin, Germany
No Drawing. Filed Mar. 28, 1967, Ser. No. 626,426
Claims priority, application Germany, Apr. 2, 1966, Sch 38,777
Int. Cl. C07c *169/10, 169/22;* A61k *17/00*
U.S. Cl. 260—239.55                               7 Claims

ABSTRACT OF THE DISCLOSURE 15,16β-methylene steroids and their preparation.

---

The invention relates to methods of preparing 15,16β-methylene-steroids, preferably steroids of the estrane and androstane series, having in part the formula

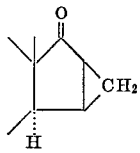

characterized in that corresponding $\Delta^{15}$-17-ketosteroids are methylenated at the 15,16 double bond.

In carrying out the methylenation, one starts from a trimethyloxosulfonium salt (such as the halide, perchlorate, methyl sulfate) which is reacted in dimethylsulfoxide with a base, such as potassium or sodium tert-butylate or sodium hydroxide in a solvent such as dimethylsulfoxide or dimethylformamide to form dimethylmethylenesulfonium oxide and the latter, without being isolated, is reacted, with the α,β-unsaturated ketone at a temperature between —40 and 100° C., preferably at room temperature.

Some facts about the reaction of α,β-unsaturated ketones with dimethylmethylenesulfonium oxide have become known (see Chem. Ber. 98 (1965) 1470, and German Patent 1,183,500). Still the smooth course of the reaction in the instant case is surprising because those skilled in the art know that $\Delta^{15}$-17-ketones are readily deconjugated to $\Delta^{14}$-17 ketones in the presence of an alkaline catalyst, or converted to $\Delta^{15}$-17-ketones of the 14β series (JACS 82 (1960) 3209). Moreover, the addition according to the invention at the 15,16-double bond in β-position is surprising because it is known that the methylene group is introduced in α-position when dimethylmethylenesulfonium oxide is used (German Patent 1,183,500).

Methylenation may also be achieved by adding diazomethane to the $\Delta^{15}$-double bond, and by subsequently splitting the pyrazoline ring so formed by known methods. It is also surprising in the diazomethane method that the methylene group is added to the 15,16-double bond in the β-position because it is known from the literature that the methylene group when added by this method is also added in the α-position (cf. German Patent 1,107,663).

Other than the $\Delta^{15}$-17 ketone, the starting material may contain any other groups which are inert to the methylenation agent. Inert groups, for the purpose of this discussion, include for example, hydroxyl groups which may also be present in the esterified or etherified condition, also alkyl radicals and halogen atoms. It must be considered, however, that particularly reactive halogen atoms may participate in the reaction under the conditions of methylenation. Thus, chlorohydrines and bromohydrines are converted to epoxides in an alkaline medium. Also, a halogen ion may be exchanged against an added anion. However, the methylene addition reaction proper at the $\Delta^{15}$-double bond is not impaired by such secondary reactions.

Among interfering groups, mention may be made of readily reacting saturated keto groups, for example, in position 3, or α,β-unsaturated keto groups which still carry a hydrogen atom at the carbon atom in β-position, such as $\Delta^1$-3-ketones.

Preferred starting materials of the method of the invention are $\Delta^{15}$-17-ketosteroids having the following configurations in the A-ring

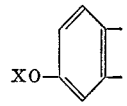

II wherein X is hydrogen alkyl, tetrahydropyranyl, or acyl,

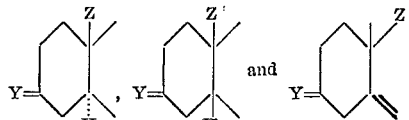

III wherein Z is hydrogen or methyl, and Y= (etc.)

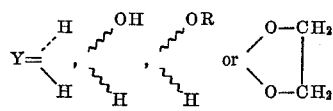

IV wherein R is alkyl, preferably lower alkyl, or acyl,

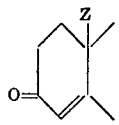

V wherein Z is hydrogen or methyl.

The 15,16β-methylenesteroids which may be prepared according to the invention may be used in the field of medicine because of their valuable pharmacological properties, or they may serve as novel starting materials for preparing new steroids because of their reactive structure.

15,16β-methylene-estrone-methyl ether, for example, may be converted to 15,16β-methylene-19-nor-testosterones which proved to be high effective protein-anabolic and relatively weak androgenic agents.

The following examples are illustrative but not restrictive of the preparation of compounds according to the invention.

Example 1

175 ml. dimethylsulfoxide, 1.44 g. sodium hydride (2.88 g. of a 50% suspension in oil, 60 millimol), and 13.25 g. trimethyloxosulfonium iodide (60 millimol) are stirred at room temperature until the development of hydrogen ceases (approx. 40 minutes). Then 14.42 g. $\Delta^{15}$-5α-androstene-3β-ol-17-one (50 millimols) are added and the mixture is stirred at room temperature for three additional hours. Precipitation with ice water yields 14.4 g. of a crude product. It is filtered in benzene over the 20-fold amount of silica gel, and the residue obtained after evaporation of the eluate is recrystallized from diisopropyl ether/acetone. There are obtained 10.5 g. 15,16β-methylene-5α-androstane-3β-ol-17-one of melting point 231–233° C.

Example 2

220 ml. dimethylsulfoxide, 2 g. sodium hydride, and 18 g. trimethyloxosulfonium iodide are stirred at room temperature until the development of hydrogen stops. 20 g. 15-dehydroestrone-methyl-ether are then added and the mixture is stirred at room temperature for three additional hours. Upon precipitation with ice water, there are obtained 20 g. of a crude product which is filtered in benzene over a 25-fold amount of silica gel. The fractions which are uniform according to their thin layer chromatograms yield 14.16 g. 15,16β-methylene-$\Delta^{1,3,5(10)}$-estratriene-3-ol-17-one-3-methyl ether of melting point 169–170.5° C. (from diisopropyl ether).

Example 3

A solution of 2 g. $\Delta^{1,3,5(10),15}$-estratetraene-3-ol-17-one-3-methyl ether in 15 ml. methylene chloride is added to 100 ml. of a solution of diazomethane in ether (prepared from 10 g. nitrosomethylurea). The mixture is left to stand at room tenperature for two days, the precipitated pyrazoline derivative is filtered off and recrystallized from acetone methylene chloride. There are obtained 1.39 g. of melting point 220–223° C. (with gas development).

1 g. pyrazoline derivative is added to a mixture of 80 ml. acetone and 0.3 ml. boron trifluoride etherate, and the resulting mixture is stirred 30 minutes at room temperature. A crude product is precipitated by means of ice water, and the dried crude product (0.91 g.) is crystallized from diisopropyl ether whereby 0.82 g. 15,16β-methylene-$\Delta^{1,3,5(10)}$-estratriene-3-ol-17-one-3-methyl ether of melting point 169–170° C. is obtained.

Example 4

(a) Water is removed by azeotropic distillation from solutions of 6.4 g. $\Delta^{1,3,5(10),15}$-estratetraene-3-ol-17-one in 200 ml. benzene and of 240 mg. p-toluenesulfonic acid in 20 ml. benzene. The solutions are cooled to room temperature and combined, mixed with 40 ml. dihydropyrane, and stirred for 1.5 hours. The acid is ultimately neutralized by shaking with cold, dilute sodium bicarbonate solution, and the sodium bicarbonate is washed out with water until the washings are neutral. After drying and evaporation of the solvent there is obtained a residue of $\Delta^{1,3,5(10),15}$-estratetraene-3-ol-17-one-3-tetrahydropyranyl ether, which, when recrystallized from ethyl acetate, melts at 180–182° C. Yield: 6.74 g.

(b) A suspension of 2.29 g. trimethyloxosulfonium iodide in 50 ml. dimethylsulfoxide is mixed with 429 mg. sodium hydride suspended in oil (50%), and the mixture is stirred under nitrogen at room temperature for 45 minutes. Thereafter, 2.6 g. $\Delta^{1,3,5(10),15}$-estratetraene-3-ol-17-one-3-tetrahydropyranyl ether are added, and the mixture obtained is stirred under nitrogen for 20 hours at room temperature. The base is subsequently neutralized with glacial acetic acid, the batch is stirred into ice water, and the precipitate is filtered off. When the residue is recrystallized, there are obtained 1.8 g. of 15,16β-methylene-$\Delta^{1,3,5(10)}$-estratriene-3-ol-17-one-3-tetrahydropyranyl ether of melting point 166–169° C.

Example 5

1 g. $\Delta^{1,3,5(10),15}$-estratetraene-3-ol-17-one is reacted with a solution of dimethylmethylenesulfonium oxide prepared from 1.16 g. trimethyloxosulfonium iodide, 220 mg. sodium hydride in 50% oil suspension, and 25 ml. dimethylsulfoxide by analogy with Example 1, and the reaction mixture is worked up. There is obtained 1 g. 15,16β-methylene-$\Delta^{1,3,5(10)}$-estratriene-3-ol-17-one.

Example 6

900 mg. $\Delta^{1,3,5(10,)15}$-estratetraene-3-ol-17-one-3-acetate are reacted with a solution of dimethylmethylenesulfonium oxide prepared by analogy with Example 1 from 1.04 g. trimethyloxosulfonium iodide, 200 mg. sodium hydride in 50% oil suspension, and 25 ml. dimethylsulfoxide, and the reaction mixture is worked up. The crude product is subsequently acetylated by means of acetic anhydride and pyridine. 600 mg. 15,16β-methylene-$\Delta^{1,3,5(10)}$-estratriene-3-ol-17-one-3-acetate are obtained.

Example 7

175 ml. dimethylsulfoxide, 144 g. sodium hydride (2.88 g. of a 50% suspension in oil, 60 millimol), and 13.25 g. trimethyloxosulfonium iodide (60 millimol) are stirred at room temperature until gas development stops (about 40 minutes). Then, there are added 16.5 g. $\Delta^{15}$-5β-androstene-3,17-dione-3-ethylene ketal (M.P. 177.5–178.5° C.; prepared from 5β-androstane-3β-ol-17-one by ketalization, bromination of the 16-position with pyridinium bromideperbromide, oxidation of the OH group in position 3, and ketalization to 16-bromo-5β-androstane-3,17-dione-diethylene-ketal, dehydrobromination with potassium tert-butylate in xylene, and partial ketal dissociation with p-toluenesulfonic acid in aqueous acetone). Stirring is continued for 90 minutes, a crude product is precipitated with ice water (14.3 g.), and purified by chromatography. 11.7 g. 15,16β-methylene-5β-androstane-3,17-dione - 3 - ethylene ketal of melting point 191–193° C. are obtained (from diisopropyl ether).

Example 8

175 ml. dimethylsulfoxide, 1.44 g. sodium hydride, and 13.25 g. trimethyloxosulfonium iodide are stirred at room temperature until gas development stops (about 40 minutes). Then, there are added 16.5 g. $\Delta^{15}$-5α-androstene-3,17-dione-3-ethylene ketal (M.P. 148.5–149.5° C.; prepared from $\Delta^{15}$-5-α-androstene-3β-ol-17-one-17-ethylene ketal (Chem. Listy, 51, 1885 (1957), and JACS 82 (1960) 3209) by oxidation of the OH group in position 3, ketalization of the resulting 3-keto group, and partial ketal dissociation with p-toluenesulfonic acid in aqueous acetone). The mixture is stirred 90 minutes at room temperature, precipitated with ice water, and the crude product is purified by chromatography. There are obtained 10.7 g. 15,16β-methylene-5α-androstane-3,17-dione - 3 - ethylene ketal of melting point 157.5–159° C. (from diisopropyl ether).

Example 9

In analogy to Example 1, 17.5 ml. dimethylsulfoxide, 144 mg. sodium hydride, and 1.33 g. trimethyloxosulfonium iodide are stirred 40 minutes at room temperature. Then 1.43 g. (5 millimol) $\Delta^{5,15}$-androstadiene-3β-ol-17-one are added, and stirring is continued for three hours. The crude product recovered by ice water precipitation is purified chromatographically, and 15,16β-methylene-$\Delta^5$-androstene-3β-ol-17-one is obtained.

Example 10

17.5 g. dimethylsulfoxide, 144 mg. sodium hydride, and 1.33 g. trimethyloxosulfonium iodide are stirred at room temperature for 40 minutes. Thereafter, 1.42 g. $\Delta^{4,15}$-androstadiene-3,17-dione (prepared from $\Delta^{5,15}$-androstadiene-3β-ol-17-one-17-ethylene ketal by oxidation in position 3 and ketal dissociation) are added and stirring continues for ¾ hour. The crude product recovered by ice water precipitation is purified chromatographically, and 15,16β-methylene-$\Delta^4$-androstene-3,17-dione is obtained.

We claim:
1. Compounds of the formula

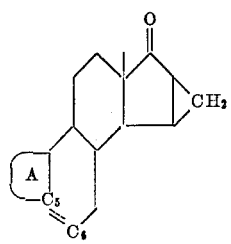

wherein

is a single or double carbon bond, and the A ring may have the following structures:

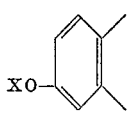

X being hydrogen, alkyl, tetrahydropyranyl, or lower acyl;

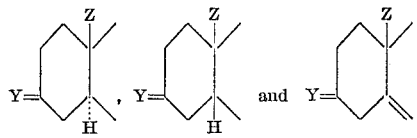

Z being hydrogen or methyl; Y being any one of the following

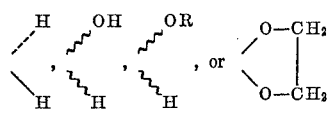

wherein R is alkyl, and preferably lower alkyl, or acyl,

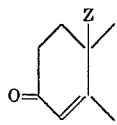

Z being hydrogen or methyl.

2. 15,16β-methylene-5α-androstane-3β-ol-17-one.
3. 15,16β-methylene-Δ$^{1,3,5(10)}$-estratriene-3-ol-17 - one-3-methyl ether.
4. 15,16β-methylene-Δ$^{1,3,5(10)}$-estratriene-3-ol - 17 - one-3-tetrahydropyranyl ether.
5. 15,16β-methylene-Δ$^{1,3,5(10)}$-estratriene-3-ol-17-one.
6. 15,16β-methylene-Δ$^{1,3,5(10)}$-estratriene-3-ol-17 - one-3-acetate.
7. The method of preparing 15,16β-methylene steroids, of the estrane and androstane series, having the partial formula

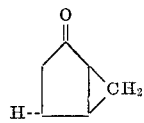

by methylenating corresponding Δ$^{15}$-17 ketosteroids at the 15,16 double bond by means of dimethylmethylenesulfonium oxide, adding diazomethane, then splitting nitrogen from the resultant pyrazoline ring so produced.

References Cited

UNITED STATES PATENTS

| | | | |
|---|---|---|---|
| 3,127,396 | 3/1964 | Wiechert et al. | 260—239.5 |
| 3,243,434 | 3/1966 | Krakower | 260—239.55 |
| 3,338,928 | 8/1967 | Beard et al. | 260—397.4 |
| 3,365,446 | 1/1968 | Cross et al. | 260—239.55 |

ELBERT L. ROBERTS, Primary Examiner

U.S. Cl. X.R.

260—239.5, 397.3, 397.4, 999